Patented Jan. 24, 1928.

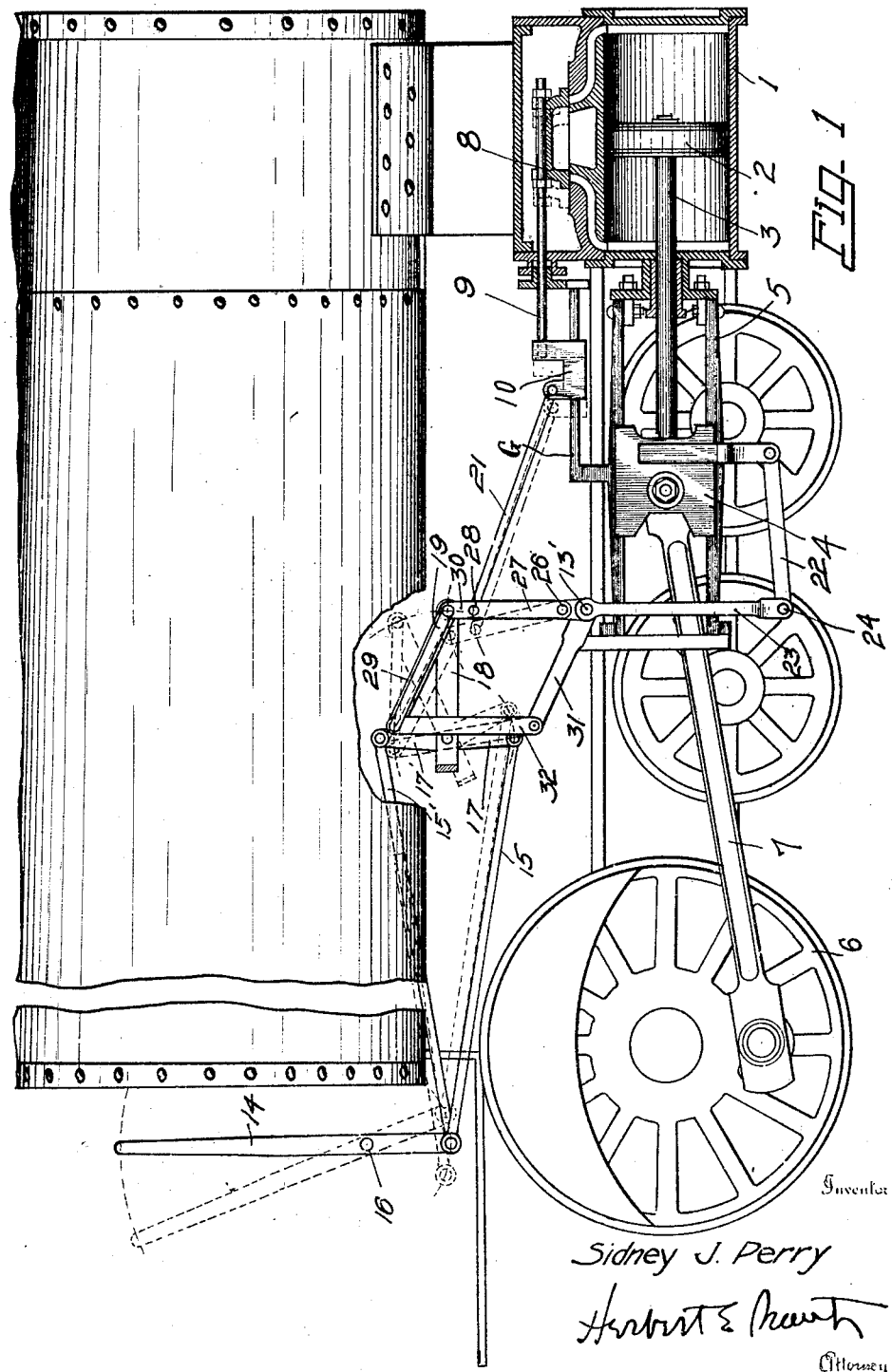

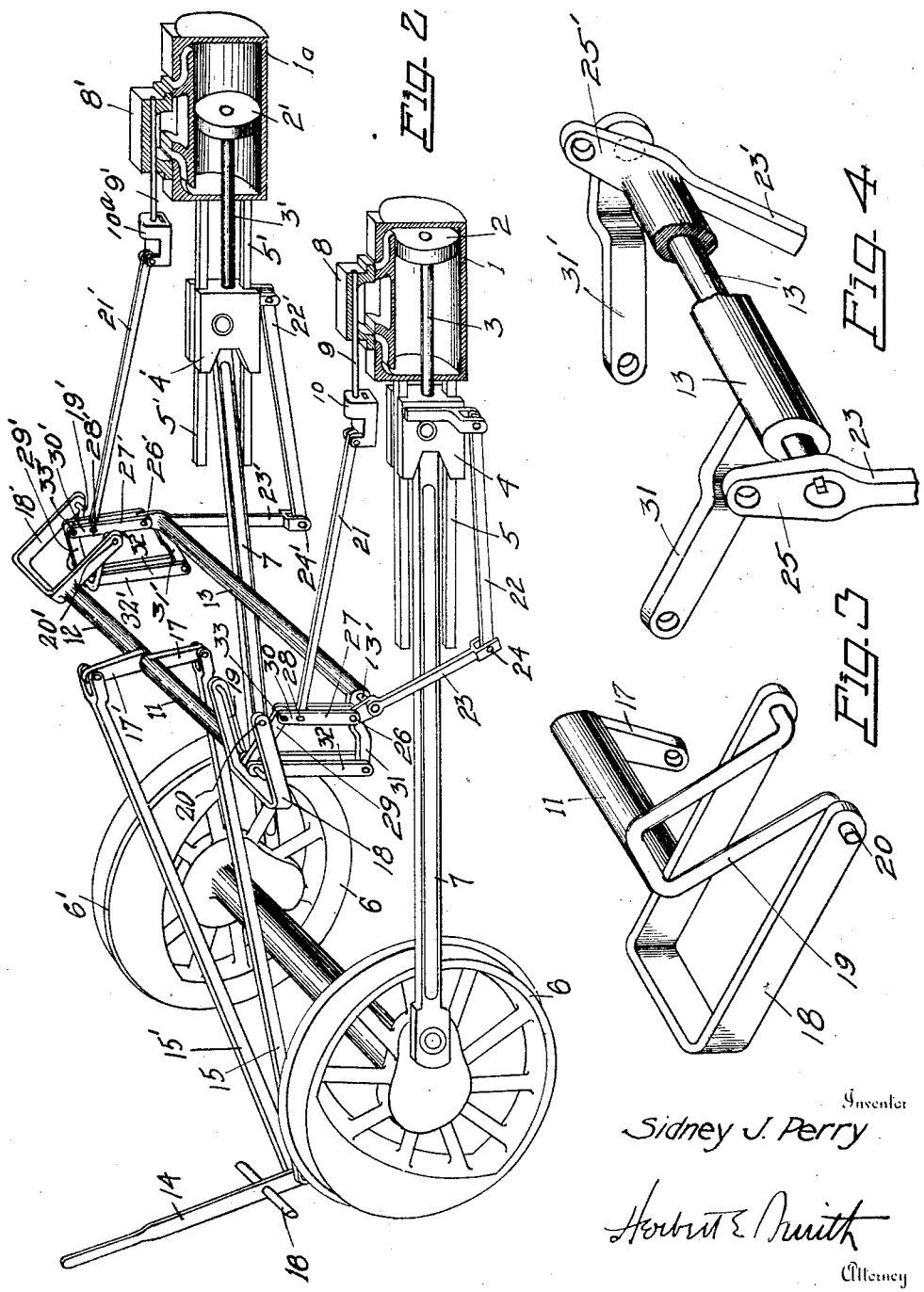

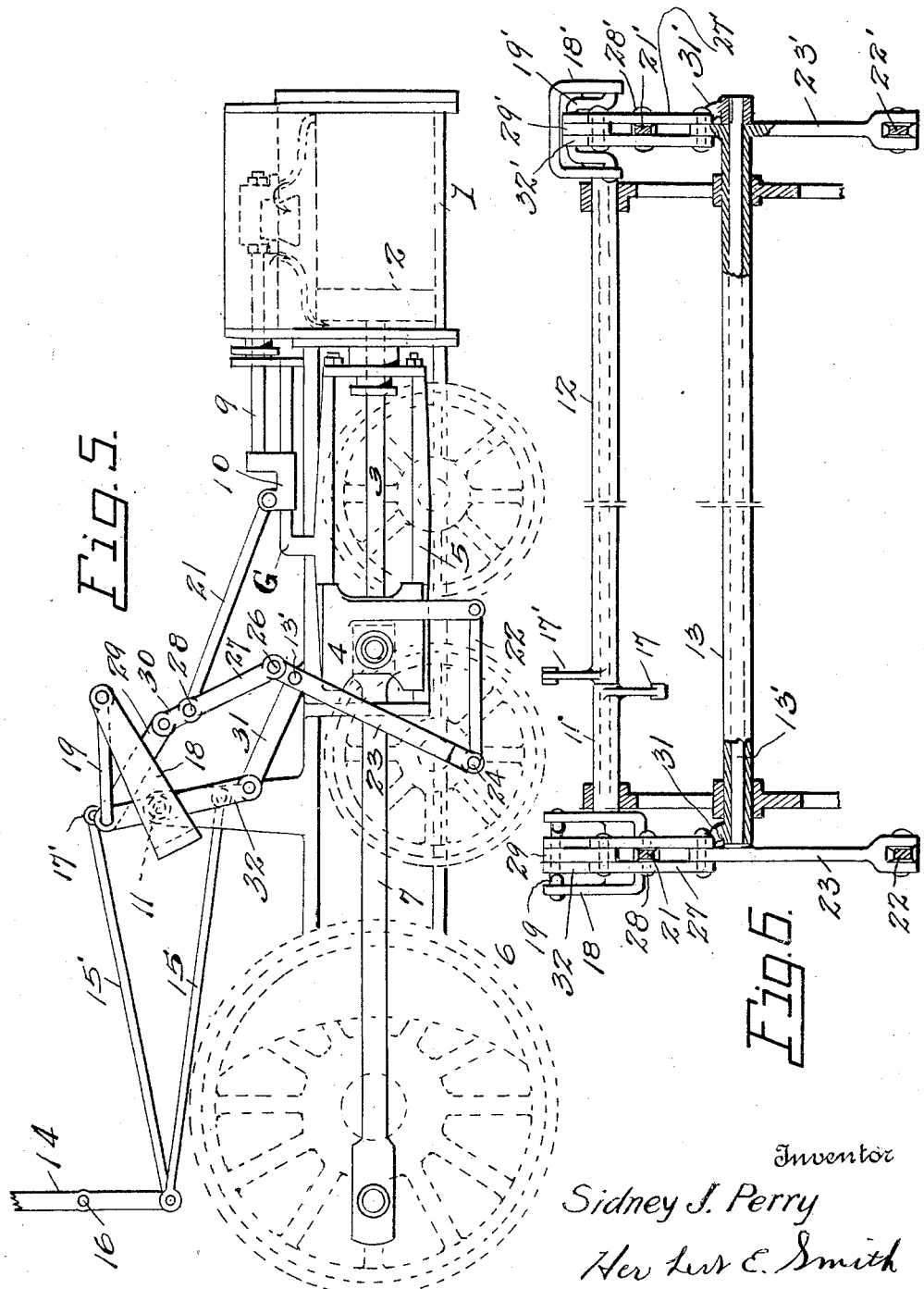

1,657,032

UNITED STATES PATENT OFFICE.

SIDNEY J. PERRY, OF SPOKANE, WASHINGTON.

VALVE GEAR.

Application filed July 18, 1921. Serial No. 485,516.

My present invention relates to improvements in valve gears for steam locomotives, of that type involving a reversible and variable cut off mechanism for the steam valves, whereby the valve gears and the motion of the gears are actuated and controlled by a combination shaft lever and bell crank, together with rock arms and connections from a cross head.

The primary object of the invention is the provision of valve gearing mechanism by means of which a quick and complete action of the valve is secured at the point of admission to the cylinders and at the cut off of steam to the cylinders. The invention also involves a well balanced mechanism which may be manipulated with facility, by hand for adjustment of the valves and for reverse movement, and by the reduction of parts to a practical minimum, economy in lubrication is insured. The utilization of a minimum of parts also correspondingly reduces the weight of the mechanism, and by the association of parts according to my invention a substantial and durable mechanism is provided to withstand wear while the locomotive is in service.

With the above ends in view the invention consists in certain novel combinations and arrangements of parts as will be hereinafter more fully described and claimed.

In the accompanying drawings I have illustrated one complete example of the physical embodiment of my invention wherein the parts are combined and arranged according to the best mode I have thus far devised for the practical application of the principles of my invention.

Figure 1 is a side view of a portion of a steam locomotive showing driving wheels, cylinder and steam chest in section, and my improved valve gear applied thereto and driven from the cross head of the piston, the full lines showing the position of gearing on the center and in dotted lines full gear ahead with the piston at mid stroke.

Figure 2 is a perspective view showing the two sides of the locomotive with the engines and valve gears and the cylinders in section.

Figure 3 is a detail view in perspective of part of the reversing mechanism.

Figure 4 is a detail view showing the pair of combined rock shafts and bell crank levers forming part of the gear mechanism.

Figure 5 is a view in side elevation of the mechanism at a position 180° from that shown in Figure 2.

Figure 6 is a view transversely of the engine showing the supporting frame in section, illustrating the telescoping rocker shafts and tumbler shafts, partly in section, and the valve gear at both sides of the locomotive.

In the preferred form of the invention as illustrated in the drawings I have designated the steam cylinders at the sides of the locomotive as 1 and $1^a$ with their usual form of pistons 2, 2' and rods 3, 3' having the cross heads 4, 4' and guide bars 5, 5' therefor. A pair of the engine driving wheels is indicated at 6, 6' and a connecting rod 7 is pivoted as usual to the cross head, while the customary form of slide valves 8, 8' are reciprocated through the instrumentality of the valve stems 9 and 9' and slide blocks 10 and $10^a$ on guides G and G'.

As indicated in the drawings the valve gear or operating mechanism at each side of the locomotive is located between the cross head which actuates the mechanism, and the valve cross head 10 of the valve stem, the valve cross head receiving motion from the valve gearing. The complementary parts of the valve gears at the sides of the locomotive are substantial duplicates, the movement of parts of the engine at the left side of the locomotive being shown in Figure 2 as ninety degrees in advance of the engine at the right or near side of the locomotive. In this figure the piston of cylinder 1 is at the extreme of its forward stroke and about to return and exhaust the steam from the cylinder, while the piston of cylinder $1^a$ is midway of its return stroke, ahead of the piston of cylinder 1.

In the drawings the two sectional, coaxial shafts 11 and 12 are supported in suitable bearings in the engine frame, as is also the rock shaft 13, and while the tumbler shaft sections 11 and 12 are relatively movable and the rock shaft 13 is oscillatable, their bearings are stationary.

The valve gearing is thus supported in the engine frame on the two shafts 11—12 and 13, and controlled from the engine cab, by hand, by manipulation of the reverse lever 14 and the two reach rods 15 and 15', the lever being pivoted on trunnions or pin 16 in suitable bearings.

The two shaft sections 11 and 12 are connected to the reach rods by their lever arms 17 and 17' and these coaxial shafts, which are preferably of telescopic construction, are turned in reverse directions or opposite directions by the forward or reverse movement of the lever 14, as readily seen in Figure 2.

At the outer extremities of the shafts 11 and 12, and beyond their bearings, are a pair of fixed yokes 18 and 18', which as seen in Figure 3, are each integral with its respective section of the divided rock shaft 11—12, and these yokes with their open ends toward the cylinders of the engines may be turned in the shaft bearings with the co-axial shaft sections as centers. Within the yokes are pivoted a pair of swinging suspension arms 19 and 19' having their trunnions 20, 20' freely pivoted and supported in the ends of the yokes, and of a length to extend back within the yokes in alinement with the axes of the divided shaft sections 11—12. Thus with the suspension arms carried by the yokes it will be apparent that when the yokes are adjusted upon the axial centers of the shaft bearings, the pivoted ends or trunnions of the suspension arms will be swung through arcs of a circle with the shaft centers as the center of movement, but the suspension arms are also free to swing on their trunnions as part of the valve gear when in operation.

From these adjustable suspension arms of the two engines are supported the frame structures of the valve gearing, in connection with the rock shaft 13 and valve rods 21 and 21' that are pivoted to the valve cross heads 10, 10ª of the valve stems 9, 9' and the valve gearing is actuated from the cross heads of the pistons through the instrumentality of rods 22, 22' as the cross heads reciprocate under steam pressure in the cylinders.

The rock shaft 13, which is hollow and supported to rock in bearings in the engine frame, encases an inner shaft 13', and as best seen in Figure 4 these co-axial shaft sections each has at one extremity a lever as 23 and 23'; the former keyed on the end of the inner shaft section 13' and the latter formed integral with the end of the hollow shaft section 13, and at 24, 24' the lower ends of these levers are pivoted to their rods 22 and 22' and thus actuated from the cross heads 4, 4'. As the cross heads reciprocate, it will be apparent that the levers 23 and 23' are caused to oscillate and this rocking movement is supported by the bearings for the concentric shaft sections 13 13' in the engine frame.

At their upper ends, the short arms 25 25' of these levers are pivoted as at 26, 26' to the complementary combination levers 27 27' and the rear ends of the valve rods 21 and 21' are pivoted at 28 28' to these combination levers, and as thus connected the reciprocating motion of the cross head is transmitted to the valve rods for the purpose of reciprocating the valves of the engines.

This reciprocation of the valves may be altered and adjusted by varying the position of the suspension yokes, and at the upper ends of the combination levers, above the valve rod connections are links 29 29' which pivotally connect the short arms 30 30' of the combination levers with the swinging suspension arms 19 19'. It will be noted that the length of these links 29 29' corresponds with the length of the suspension arms and with the distance between the pivot points of these arms and the axial centers of the divided shaft sections 11 12.

In addition to the fixed actuating levers on the rock shafts 13 and 13' these shafts have lever arms 31 and 31' rigid with the respective shafts, which, together with the levers, form bell crank levers on the shafts, and the crank arms or lever arms 31 31', at their free ends are pivotally connected with complementary links 32 and 32' that are suspended from the suspension arms 19 19'.

In Figure 2 of the drawing the yokes 18 18' are in position for full steam ahead, and when lever 14 is pushed forward to its extreme position, the position of the yokes is reversed, to provide for reverse movement of the steam pressure in the cylinders, while an intermediate position of the yokes will place the mechanism on center. Between the two extremes, the yokes may be adjusted to change the action of the actuating levers 23 23' by altering the relationship of the several pivot points of the suspension arms, suspension links and combination levers, for changing the position of the valves and altering their strokes.

In the operation of the valve gearing it will be apparent that the reciprocal movement of the cross heads of the engines is transmitted to the actuating levers, and by the bell crank leverage action to the combination levers and thence to the valve rods and valves in the steam chests.

The adjustment of the valve gearing is accomplished from lever 14 through reach rods 15 15' by means of which the divided shaft 11 12 is rocked in its bearings, the section 11 being turned in bearings in direction opposite to that of the section 12, thus adjusting the position of the two yokes 18 and 18'.

In Figure 2 the cross head 4 is at the extreme forward end of its stroke and the beginning of its return stroke while cross head 4' is in a mid position on its return stroke or ninety degrees in advance of the cross head 4. Lever 23' and crank arm 31 and suspension arm 19 with pivot pin 33 of the combination lever 27 are also at mid-position and driven by the cross head 4'. Valve 8 is just opening with the required lead to admit steam into the forward end of the cylinder, and likewise permitting exhaust out at the rear end of the cylinder. Valve 8' is open to its fullest extent and has started to close. As the cross heads advance in their strokes valve 8' is moved by the combined action of pivot pins 33' and 26' thus increasing the speed of the valve 8' and causing it to close quickly thereby cutting off the steam promptly and completely and allowing the piston to complete the remaining portion of its stroke under expansion of steam in the cylinder.

It will be noted that while trunnions 20 of the suspension arm 19 are located above the pivot 33 of the short arm of the actuating lever 30, the trunnions 20' are depressed below the pivot 33' in order that these pins 33 33' shall reciprocate ninety degrees in advance of the cross heads.

The pivot pins 26 26' also move in advance of the pins 33 33' and therefore rock arms 25 25' carrying the pins 26 26' provide for the necessary angle of advance from lap to lead of the valves. The movement of the pins 33 33' provide for the port opening of the valves, and the variation in elevation or depression of the trunnions 20 20' will increase the reciprocation or movement of the pins 33 33'. As the trunnions 20 20' are brought nearer alinement with the pins 33 33', the reciprocal action of the pins is reduced and hence the greater will be the ratio of angle of advance of the pins 28 28', valves 8 and 8', and consequently an earlier cut off of steam will be secured with greater expansion of steam.

Having thus fully described my invention, what I claim as new and desire to secure by Letters Patent is—

1. In a valve gear, the combination with cross heads, valve rods, combination levers and links, of a transversely disposed hollow rock shaft having a crank arm, an actuating lever on said shaft having a link pivotally connected to one cross head, an inner rock shaft co-axial with said hollow rock shaft and having a crank arm and an actuating lever and link pivotally connected to the other cross head, a pair of adjustable yokes, a pivoted suspension arm in each yoke and links pivotally supported from each suspension arm and pivotally connected with said crank arm, whereby part of the valve motion is obtained from one side of a locomotive and part from the other side.

2. In a valve gear the combination with a transversely disposed hollow rock shaft having a crank arm at one end and an inner rock shaft co-axial with said hollow rock shaft and having a crank arm at its opposite end, of a pair of spaced reversely adjustable yokes and a U-shaped suspension arm in each yoke, a link connecting each suspension arm with a crank arm, an actuating lever on each shaft, a cross head and a link connecting the cross head to the actuating lever, a second link on each suspension arm and a combination lever connecting said link to an actuating lever, and a valve rod pivoted to each combination lever, whereby part of the valve motion is obtained from one side of a locomotive and part from the other side.

3. The combination with a transversely disposed, divided, tumbler shaft comprising oppositely adjustable sections, an operating lever and connections therefrom for turning said sections, supporting yokes, valve rods, a link and a combination lever pivotally connecting each said arm and rod, crank arms and links connected to said arms, a cross head, and means connected with said cross head for actuating said combination levers, whereby part of the valve motion is obtained from one side of a locomotive and part from the other side.

4. The combination with transversely disposed oppositely rotatable tumbler shaft sections having yokes thereon, said shafts and yokes together being adjustable as to position, pivoted arms in said yokes, and valve rods, of a pair of links suspended from each arm, a combination lever pivotally connecting one link of each said pair with a valve rod, an inner and an outer co-axial rock shaft each having an actuating lever operatively connected with said combination lever, a crank arm on each rock shaft, a link pivotally connecting the respective crank arms with the second link of said pair, a cross head, and means connected with the cross head for operating the actuating shafts, whereby part of the valve motion is obtained from one side of a locomotive and part from the other side.

In testimony whereof I affix my signature.

SIDNEY J. PERRY.